(12) United States Patent
Strauss et al.

(10) Patent No.: US 10,616,255 B1
(45) Date of Patent: *Apr. 7, 2020

(54) DETECTING CLOAKING OF WEBSITES USING CONTENT MODEL EXECUTING ON A MOBILE DEVICE

(71) Applicant: Facebook, Inc., Menlo Park, CA (US)

(72) Inventors: Emanuel Alexandre Strauss, San Mateo, CA (US); Siqi Nie, Belmont, CA (US); Zixiao Chang, Seattle, WA (US); Hongda Ma, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 241 days.

This patent is subject to a terminal disclaimer.

(21) Appl. No.: 15/899,876

(22) Filed: Feb. 20, 2018

(51) Int. Cl.
*H04L 29/06* (2006.01)
*G06N 20/00* (2019.01)

(52) U.S. Cl.
CPC ......... *H04L 63/1425* (2013.01); *G06N 20/00* (2019.01); *H04L 63/10* (2013.01); *H04L 63/20* (2013.01)

(58) Field of Classification Search
CPC ............................ H04L 63/1425; H04L 63/10
USPC ............................................................ 726/3
See application file for complete search history.

(56) References Cited

U.S. PATENT DOCUMENTS

| 2007/0192855 | A1* | 8/2007 | Hulten | H04L 63/1441 726/22 |
| 2007/0208822 | A1* | 9/2007 | Wang | H04L 63/1416 709/217 |
| 2009/0094175 | A1 | 4/2009 | Provos et al. | |
| 2010/0313266 | A1 | 12/2010 | Feng et al. | |
| 2011/0276716 | A1 | 11/2011 | Coulson et al. | |
| 2016/0142439 | A1 | 5/2016 | Goutal | |
| 2017/0279823 | A1* | 9/2017 | Lin | H04L 63/1408 |

OTHER PUBLICATIONS

Akiyama, M., et al. "Analyzing the Ecosystem of Malicious URL Redirection Through Longitudinal Observation from Honeypots," Computers & Security, vol. 69, Jan. 11, 2017, p. 155-173.
(Continued)

*Primary Examiner* — Longbit Chai
(74) *Attorney, Agent, or Firm* — Fenwick & West LLP (57) ABSTRACT

A mobile device generates a first representation, based on a model, of a first content received by the mobile device from a website. An online system receives the representation of the content from the mobile device. The online system receives a second content from the website and generates a representation of the second content using the model. The online system compares the representation of the first content with the representation of the second content to determine a distance between the two representations. The distance indicates a level of similarity between the first content and the second content. The online system compares the distance between the representation of the first content and representation of the second content to determine if the distance exceeds a threshold distance. If the distance exceeds the threshold distance, the online system prevents other mobile devices from accessing the website.

20 Claims, 4 Drawing Sheets (56) References Cited

OTHER PUBLICATIONS

Google Webmaster Central Blog, "Specify your Canonical," Feb. 12, 2009, seven pages, [Online] [Retrieved Aug. 19, 2019], Retrieved from the internet <URL:https://webmasters.googleblog.com/2009/02/specify-your-canonical.html>.
United States Office Action, U.S. Appl. No. 15/828,219, dated Aug. 22, 2019, eight pages.

* cited by examiner

DETECTING CLOAKING OF WEBSITES USING CONTENT MODEL EXECUTING ON A MOBILE DEVICE

BACKGROUND

This invention relates generally to detecting website cloaking by generating semantic representations of content at mobile devices, and comparing the semantic representations obtained from the mobile devices with semantic representations of content generated at an online system.

Online systems often have policies regarding what content can be posted to the online system and what content can be linked from content distributed by the online system. For example, an online social networking system may restrict users from posting and linking to certain types of content, such as adult content, violent content, threats, content related to criminal activity, or fraudulent content. To enforce these policies, the online social networking system monitors content and blocks content that is determined to be in violation of a policy. To thwart the online system's ability to detect linked content that violates a policy, certain websites perform cloaking of the content they publish to the online system.

Websites perform cloaking by providing different content to different users. For example, a website may identify a user that is requesting content from the website, or identify information describing the device, such as the device's IP address. The website then provides "good" content to devices that are determined to be within an online system that enforces a policy, such as devices used for monitoring and maintaining an online system, for example, a social networking system. The website provides "bad" content (e.g., content that is in violation of a policy) to other devices, such as devices that are used by users of the social networking system and that are identified as being external the online system. The good content shown to devices within the online system "cloaks" the content that is shown to external devices, making it difficult for the online system to know the true nature of the content that the website is delivering to the external users of the online system. Conventional techniques fail to detect policy violations by websites that perform cloaking.

SUMMARY

To detect websites that deliver bad content to mobile devices, an online system transmits a model to mobile devices for generating a semantic representation of content received. When a mobile device accesses content (e.g., website content accessed via a uniform resource locator included in a newsfeed provided by a social networking system), the mobile device executes the model to generate a semantic representation of the accessed content. The semantic representation may be, for example, a series of scores or a vector representation of the content extracted as an embedding from a neural network. The mobile device transmits the semantic representation of the content received from the website to the online system. The semantic representation abstracts the data that is transmitted from the mobile device to the online system, so that the online system does not receive user data. The online system obtains an additional semantic representation of content received from the same website and compares the additional semantic representation to the semantic representation from the mobile device. For example, a device internal to the online system may request content from the website and generate a semantic representation for the content. If the two semantic representations are significantly different, the online system determines that the website is performing cloaking. The online system determines that content from the website is likely to violate policies of the online system and may prevent mobile devices from accessing the website, for example, by blocking content that includes links to the website. In other embodiments, the online system uses a classifier to determine whether the semantic representation received from the mobile device indicates that the content received at the mobile device violates a policy.

Using a semantic representation provides sufficient information about the content for the online system to detect cloaking in the content. The semantic representation also maintains privacy of the user by obscuring the details of the content received by the user that the user may not want passed to the online system. In addition to maintaining privacy, using a semantic representation involves a relatively small amount of data transfer between the online system and the mobile devices, thereby providing an efficient mechanism of transmitting information between mobile devices and the online system.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
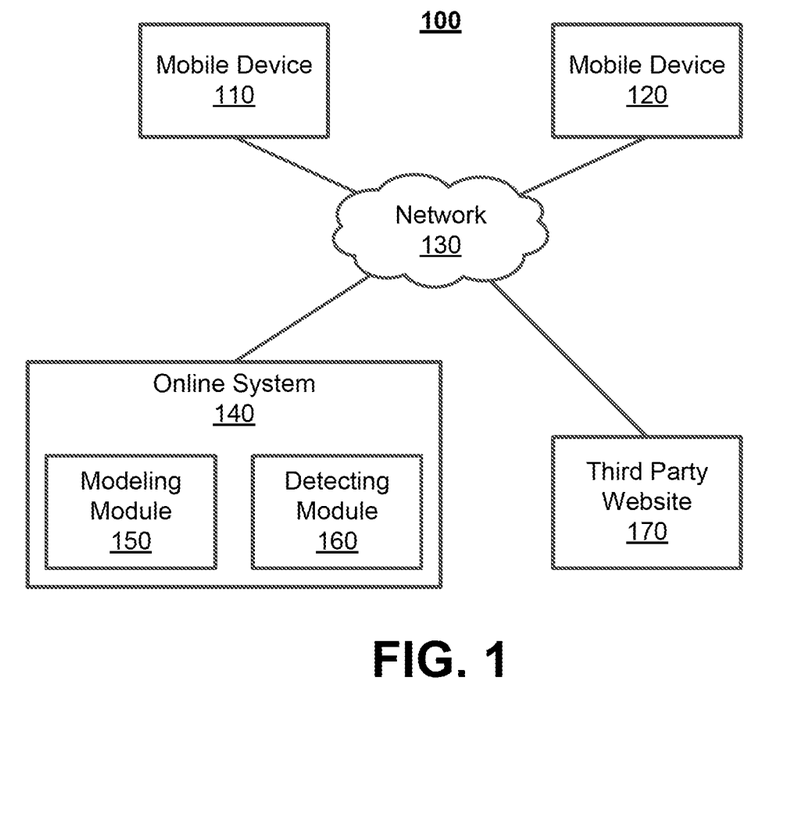
FIG. 1 is a block diagram of a system environment of an online system for detecting cloaking, in accordance with an embodiment.

FIG. 1 is a block diagram of a system environment 100 of an online system 140 for detecting cloaking, according to one embodiment. The system environment 100 shown by FIG. 1 includes mobile devices 110 and 120; a network 130; the online system 140, and one or more third party websites 170. In alternative configurations, different and/or additional components may be included in the system environment 100. For example, the online system 140 can be a social networking system, a content sharing network, or another system providing content to users. The online system 140 provides content items to the mobile devices 110 and 120. The content items may be posted or provided to the online system 140 by a third party website 170 or by users of other mobile devices 110 and 120. The online system 140 enforces a policy regarding these content items. In particular, the online system 140 analyzes the content provided by third party websites 170 and users of mobile devices 110 and 120 to determine whether the content adheres to the policy. The online system 140 selects content items that adhere to the policy for presentation on the mobile devices 110 and 120 to users, and blocks content items or portions of content items that do not adhere to the policy from presentation on the mobile devices 110 and 120.

The mobile devices 110 and 120 are computing devices capable of receiving user input as well as transmitting and/or receiving data via the network 130. Alternatively, a mobile device 110 or 120 may be a device having computer functionality, such as a personal digital assistant (PDA), a mobile telephone, a smartphone, a tablet, a laptop computer, or another suitable device. Mobile devices 110 and 120 are configured to communicate via the network 130. In one embodiment, one or both mobile devices 110 and 120 executes an application allowing a user of the mobile device 110 or 120 to interact with the online system 140. In one example, the mobile device 110 executes a browser application to enable interaction between the mobile device 110 and the online system 140 via the network 130, while mobile device 120 interacts with the online system 140 through an application programming interface (API) running on a native operating system of the mobile device 110, such as IOS® or ANDROID™.

The mobile devices 110 and 120 receive content from the online system 140. The content may be provided to the online system 140 by other mobile devices 110 and 120, by third party websites 170, or by a combination of sources. The mobile devices 110 and 120 generate a semantic representation of content they receive, and transmit the semantic representation of content to the online system 140. The semantic representation obscures the details of the content received by the mobile devices 110 and 120 to maintain privacy of the user of the mobile devices 110 and 120.

The mobile devices 110 and 120 are configured to communicate via the network 130, which may comprise any combination of local area and/or wide area networks, using both wired and/or wireless communication systems. In one embodiment, the network 130 uses standard communications technologies and/or protocols. For example, the network 130 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 130 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 130 may be represented using any suitable format, such as hypertext markup language (HTML) or extensible markup language (XML). In some embodiments, all or some of the communication links of the network 130 may be encrypted using any suitable technique or techniques.

The online system 140 includes a modeling module 150 and a detecting module 160. The modeling module 150 generates a model that is used to create semantic representations of content. Generating the model is described in detail with reference to FIGS. 3-5. The model is transmitted via the network 130 to the mobile devices 110 and 120 for use by the mobile devices 110 and 120. The online system 140 receives semantic representations of content from the mobile devices 110 and 120 and passes these semantic representations to the detecting module 160. The detecting module 160 detects cloaking based on the received semantic representations. Cloaking detection is described in detail with reference to FIGS. 3-5.

One or more third party websites 170 may be coupled to the network 130 for providing content to the mobile devices 110 and 120 via the online system 140. The third party website 170 may also provide content the online system 140. The third party website 170 may perform cloaking by providing content to the online system 140 that is different from content provided to the mobile devices 110 and 120 while representing to the online system 140 that the same content is being provided to both the online system 140 and the mobile devices 110 and 120. For example, the third party website 170 may detect information about the user requesting the content, and in response to determining that the user requesting the content is within the online system 140, the third party website 170 provides "clean" content that cloaks the content that it provides to the mobile devices 110 and 120. In an embodiment, a user within the online system is another mobile device interacting with the third party system on behalf of the online system, for example, a mobile device that performs testing of validation of third party websites on behalf of the online system. The mobile device interacting with the third party system on behalf of the online system belong to certain sets of network addresses, for example, internet protocol (IP) addresses or netblocks. In an embodiment, a server or any computing device of the online system may execute a process, for example, a browser emulator or a crawler, to request content from the third party website 170. The third party website 170 may analyze the network addresses of the computing devices sending requests to the third party website 170 to determine whether the computing device is operating on behalf of the online system or belongs to a user of the online system who is not operating on behalf of the online system and is simply a member or user of the online system. The third party website 170 may receive the network addresses of the computing devices operating on behalf of the online system from an expert user, for example, a system administrator.

Both the mobile devices 110 and 120 and the third party websites 170 may be capable of performing cloaking. Like the third party website 170, the mobile devices 110 and 120 may provide content, via the online system 140, to other mobile devices, and the mobile devices 110 and 120 may cloak the content that they provide to other mobile devices from the online system 140. Further, a third party website 170 may be considered a user or member of the online system 140, like users of the mobile devices 110 and 120, further blurring a line between the third party website 170 and the mobile devices 110 and 120. For convenience, this description generally refers to the third party website 170 as the provider of cloaked (or uncloaked) content, and refers to the mobile devices 110 and 120 as the recipients of the cloaked (or uncloaked) content. However, it should be understood that in some embodiments, the mobile devices 110 and 120 provide content to other mobile devices and/or the third party website 170, and the mobile devices 110 and 120 may also be capable of cloaking content from the online system 140.

Figure 2:
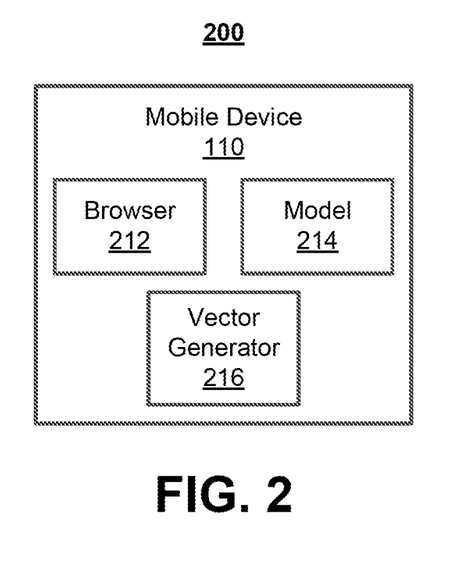
FIG. 2 is a block diagram of a mobile device that receives content via the online system, in accordance with an embodiment.

FIG. 2 is a block diagram 200 of a mobile device 110 that receives content via the online system 140, in accordance with an embodiment. The mobile device 110 includes a browser 212, a model 214, and a vector generator 216. The browser 212 requests and receives online content from websites, such as the third party website 170. In some embodiments, the browser 212 operates as a standalone application on the mobile device 110. In other embodiments, the browser 212 is a component of an application running on the mobile device 110. For example, if the mobile device 110 runs a social network application for accessing features of a social networking system represented by the online system 140, the social network application can include the browser 212.

The browser 212 can access a website, such as the third party website 170, which is linked by content received from the online system 140. For example, if the online system 140 provides a social network feed to the mobile device 110, a post (also referred to as a "story") on the social network feed can include a uniform resource locator (URL) that links to the third party website 170. In general, a feed story is a piece of content from a mobile device 110, third party website 170, the online system 140, or other source that is aggregated by the online system 140 with other feed stories and provided to mobile devices 110 by the online system 140 in a feed. The browser 212 accesses the website linked in a feed story when a user of the mobile device 110 selects a link to the third party website 170 in the social network feed. In other embodiments, the browser 212 accesses and displays content from the third party website 170 directly in the social network feed, without receiving an explicit user instruction to retrieve the content. For example, a social network application running on the mobile device 110 may embed web content retrieved by the browser 212 from the third party website 170 as a story in the social network feed. In other embodiments, the browser 212 retrieves the social network feed, e.g., in a web page provided by the online system 140. This social network feed retrieved by the browser 212 can include links to web content that is retrieved by the browser 212 from the third party website 170 in response to a user request, or the social network feed retrieved by the browser 212 can embed content automatically retrieved by the browser 212 from the third party website 170.

The model 214 provides a framework for generating semantic representations of content received from the third party website 170 by the browser 212. In the example shown in FIG. 1, the semantic representation is a vector, such as a vector of scores describing aspects of the content, or an embedding vector that provides a representation of the content in many dimensions. The semantic representation vector obscures the details of the content received from the third party website 170 by the browser 212. This ensures privacy of the user by obscuring any user information included in the content that the user may not want passed to the online system. The model 214 may include rules for generating the semantic representation vector based on the text, images, video, audio, animated content, or other types of content provided by the third party website 170. For example, the model 214 may specify that the semantic representation is based on one or more of the subject matter of the content, the type of content (e.g., whether the content includes Flash animation or sound), or the ratio of different types of content (e.g., whether the content is mostly text or mostly images, or whether the HTML code for the web site includes mainly text or mainly HTML tags).

The vector generator 216 generates a semantic representation of content received from the third party website 170 by the browser 212. The vector generator 216 generates the semantic representation vector based on the model 214. In an embodiment, the vector generator 216 generates the vector representation of the content by extracting the output of a hidden layer of a neural network that receives the content item as input and processes it. For example, the neural network may be an autoencoder that is configured to regenerate the input data as its output. The vector generator 216 can generate the vector based on the HTML code provided by the third party website 170 and/or the content, including retrieved images and ads, that is displayed by browser 212 based on the HTML code. In this embodiments, the model 214 provides a framework for the vector generator 216 to analyze the content and generate a vector. In other embodiments, the model 214 and the vector generator 216 are a single module, e.g., a model 214 that provides a vector directly based on input from the browser.

The vectors generated by the vector generator 216 are transmitted by the mobile device 110 to the online system 140. The mobile device 110 may transmit each vector individually, or the mobile device 110 may store batches of vectors and transmit a batch periodically to the online system 140. The mobile device 110 may store data identifying the source of the content, e.g., a URL accessed by the browser 212, and transmit the source to the online system 140. The source of the content is used by the online system 140 to access the same website and, if needed, enforce a content policy with respect to the website, as described with respect to FIG. 3.

Additional mobile devices, such as mobile device 120, have a browser, model, and vector generator similar to the browser 212, the model 214, and the vector generator 216 of mobile device 110. Other mobile devices have a browser 132, but do not have a model or a vector generator. Such mobile devices do not assist in detecting cloaking, but they are still protected by the online system 140 from cloaked content. For example, once the online system detects using one or more mobile devices that a third party website performs cloaking, the online system may block content including URLs of the third party website from going to all mobile devices, thereby protecting them from content that provides access to these websites.

Figure 3:
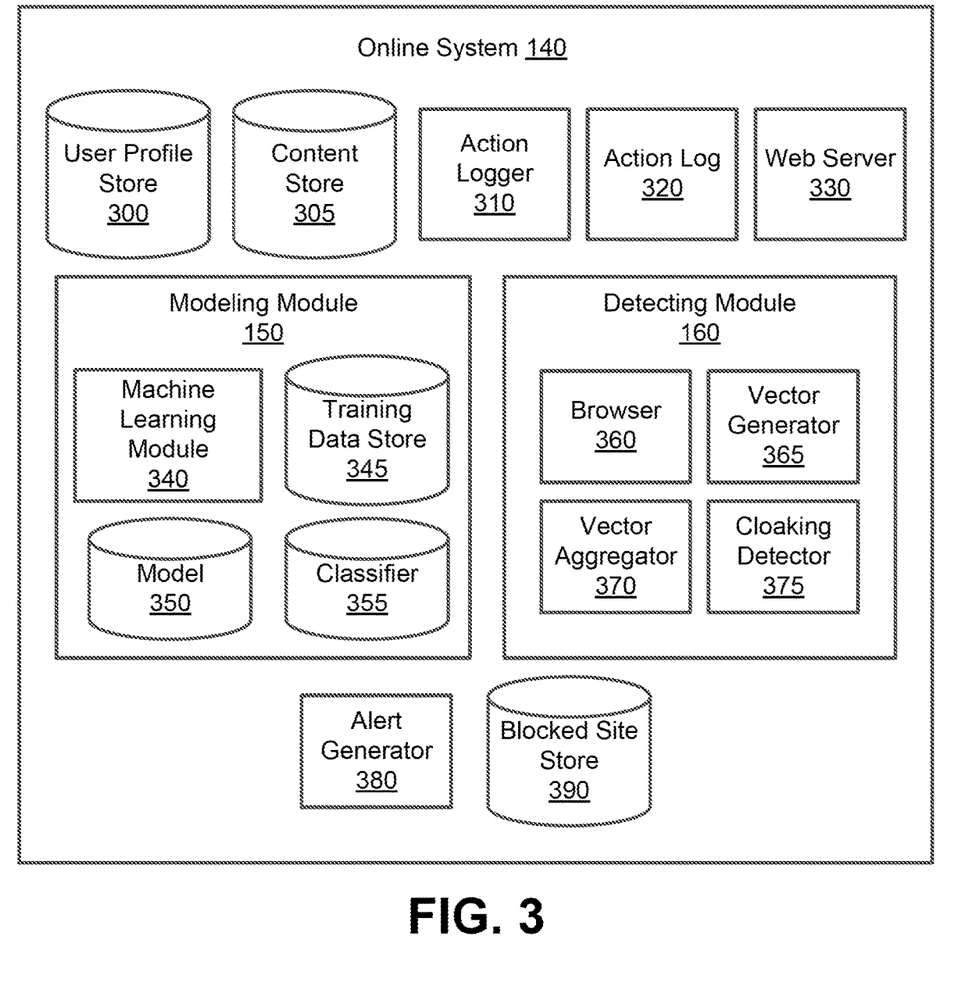
FIG. 3 is a block diagram of the online system, in accordance with an embodiment.

FIG. 3 is a block diagram of an architecture of the online system 140, according to one embodiment. The components of the online system 140 provide modules and components for detecting cloaking and protecting mobile devices from cloaked content. The online system 140 shown in FIG. 3 includes a user profile store 300, a content store 305, an action logger 310, an action log 320, a web server 330, a modeling module 340, a detecting module 360, an alert generator 385, and a blocked site store 390. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 300. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 300 may also maintain references to actions by the corresponding user performed on content items in the content store 305 and stored in the action log 320.

While user profiles in the user profile store 300 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 305 stores objects that each represents various types of content. Examples of content represented by an object include a page post, a status update, a photograph, a video, a link, a shared content item, a gaming application achievement, a check-in event at a local business, an advertisement, a brand page, or any other type of content. Online system users may create objects stored by the content store 305, such as status updates, photos tagged by users to be associated with other objects in the online system 140, events, groups, or applications. In some embodiments, objects, such as advertisements, are received from third-party websites (e.g., third party website 170) or third-party applications separate from the online system 140. In one embodiment, objects in the content store 305 represent single pieces of content, or content "items" or "stories." Hence, online system users are encouraged to communicate with each other by posting text and content items of various types of media to the online system 140 through various communication channels. This increases the amount of interaction of users with each other and increases the frequency with which users interact within the online system 140.

One or more content items included in the content store 305 include content for presentation to a user and a bid amount. The content is text, image, audio, video, or any other suitable data presented to a user. In various embodiments, the content also specifies a page of content. For example, a content item includes a landing page specifying a network address of a page of content to which a user is directed when the content item is accessed. The bid amount is included in a content item by a user and is used to determine an expected value, such as monetary compensation, provided by an advertiser to the online system 140 if content in the content item is presented to a user, if the content in the content item receives a user interaction when presented, or if any suitable condition is satisfied when content in the content item is presented to a user. For example, the bid amount included in a content item specifies a monetary amount that the online system 140 receives from a user who provided the content item to the online system 140 if content in the content item is displayed. In some embodiments, the expected value to the online system 140 of presenting the content from the content item may be determined by multiplying the bid amount by a probability of the content of the content item being accessed by a user.

In various embodiments, a content item includes various components capable of being identified and retrieved by the online system 140. Example components of a content item include: a title, text data, image data, audio data, video data, a landing page, a user associated with the content item, or any other suitable information. The online system 140 may retrieve one or more specific components of a content item for presentation in some embodiments. For example, the online system 140 may identify a title and an image from a content item and provide the title and the image for presentation rather than the content item in its entirety.

Various content items may include an objective identifying an interaction that a user associated with a content item desires other users to perform when presented with content included in the content item. Example objectives include: installing an application associated with a content item, indicating a preference for a content item, sharing a content item with other users, interacting with an object associated with a content item, or performing any other suitable interaction. As content from a content item is presented to online system users, the online system 140 logs interactions between users presented with the content item or with objects associated with the content item. Additionally, the online system 140 receives compensation from a user associated with content item as online system users perform interactions with a content item that satisfy the objective included in the content item.

Additionally, a content item may include one or more targeting criteria specified by the user who provided the content item to the online system 140. Targeting criteria included in a content item request specify one or more characteristics of users eligible to be presented with the content item. For example, targeting criteria are used to identify users having user profile information, edges, or actions satisfying at least one of the targeting criteria. Hence, targeting criteria allow a user to identify users having specific characteristics, simplifying subsequent distribution of content to different users.

In one embodiment, targeting criteria may specify actions or types of connections between a user and another user or object of the online system 140. Targeting criteria may also specify interactions between a user and objects performed external to the online system 140, such as on a third party website 170. For example, targeting criteria identify users that have taken a particular action, such as sent a message to another user, used an application, joined a group, left a group, joined an event, generated an event description, purchased or reviewed a product or service using an online marketplace, requested information from a third party website 170, installed an application, or performed any other suitable action. Including actions in targeting criteria allows users to further refine users eligible to be presented with content items. As another example, targeting criteria identifies users having a connection to another user or object or having a particular type of connection to another user or object.

The action logger 310 receives communications about user actions internal to and external to the online system 140 and populates the action log 320 with information about these user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 320.

The action log 320 may be used by the online system 140 to track user actions on the online system 140, as well as actions on third party websites 170 that communicate information to the online system 140. Users may interact with various objects on the online system 140, and information describing these interactions is stored in the action log 320. Examples of interactions with objects include: commenting on posts, sharing links, checking-in to physical locations via a mobile device 110 or 120, accessing content items, and any other suitable interactions. Additional examples of interactions with objects on the online system 140 that are included in the action log 320 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 320 may record a user's interactions with advertisements on the online system 140 as well as with other applications operating on the online system 140. In some embodiments, data from the action log 320 is used to infer interests or preferences of a user, augmenting the interests included in the user's user profile and allowing a more complete understanding of user preferences.

The action log 320 may also store user actions taken on a third party website 170, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 320 may record information about actions users perform on a third party website 170, including webpage viewing histories, advertisements that were engaged, purchases made, and other patterns from shopping and buying. Additionally, actions a user performs via an application associated with a third party website 170 and executing on a mobile device 110 or 120 may be communicated to the action logger 310 by the application for recordation and association with the user in the action log 320.

The web server 330 links the online system 140 via the network 130 to the mobile devices 110 and 120, as well as to the one or more third party websites 170. The web server 330 serves web pages, as well as other content, such as JAVA®, FLASH®, XML, and so forth. The web server 330 may receive and route messages between the online system 140 and the mobile devices 110 and 120, for example, instant messages, queued messages (e.g., email), text messages, short message service (SMS) messages, or messages sent using any other suitable messaging technique. A user may send a request to the web server 330 to upload information (e.g., images or videos) that are stored in the content store 305. Additionally, the web server 330 may provide application programming interface (API) functionality to send data directly to native mobile device operating systems, such as IOS®, ANDROID™, or BlackberryOS.

The modeling module 150 includes a machine learning module 340, a training data store 345, a model 350, and a classifier 355. The machine learning module 340 trains the model 350 based on a training data store 345. The machine learning module 340 may also train one or more classifiers 355 based on the training data store 345. The classifiers 355 can be used to assess semantic representations generated using the model 350.

The machine learning module 340 uses machine learning techniques to generate the model 350 and classifier 355. The model 350 generated by the machine learning module 340 provides a framework for generating a semantic representation for content received from the third party website 170. In an embodiment, the model comprises a set of weights associated with a set of features for generating the output score as a weighted aggregation of scores associated with the features. In another embodiment, the model comprises the set of weights along with instructions for aggregating the weights for generating the output score. The model 350 may be the same as the model 214 in the mobile device 110. In particular, the model 350 may have been transmitted by the online system 140 to the mobile device 110, which stored the received model as model 214. In some embodiments, the model 350 is used by a vector generator (e.g., vector generator 216 or vector generator 365, discussed below) to generate a vector that represents characteristics of content received from a third party website 170. The machine learning module 340 may further generate a classifier 355 that takes as input a vector generated using the model 350 and returns an indication of whether the content represented by the vector is in violation of a policy, or resembles other content that is known to violate the policy. The machine learning module 340 may generate a single classifier 355 for detecting any policy violation, or the machine learning module 340 may generate multiple classifiers 355, each of which detects one policy violation or a subset of the policy violations.

Training data from the training data store 345 is ingested by the machine learning module 340 to generate the model 350 and any classifiers 355. The training data includes previously-analyzed content and data describing the content, such as whether the content violates a particular policy, why the content item violates the policy, a type or subject matter of the content, the content provider, or any other data relative to training the model 350 and the classifier 355. In some embodiments, the training data does not provide data specific to a particular policy, and instead merely indicates whether or not each content item is in violation of the set of policies. The training data store 345 may include data obtained from the action log 320. The action log 320 may include data describing the content provided by an online system monitor or by outside users, such as users of mobile devices 110 and 120. If the training data store 345 includes unobscured content received from mobile devices 110 and 120, this unobscured content was obtained by the online system 140 after receiving consent from the users of the mobile devices 110 and 120 to transmit unobscured content to the online system 140 for training purposes. In other embodiments, the training data store 345 does not include any unobscured content from user devices, and was instead obtained by the online system 140, e.g., using the browser 360.

The machine learning module 340 may generate the model 350 based on optimization of different types of content analysis models, including but not limited to algorithms that analyze received website content separately or analyzes sets of content together. The model 350 generated by the machine learning module 340 may include a neural network, a tree-based model, kernel methods, splines, or an ensemble of one or more of these techniques. The machine learning module 340 may determine the weights of the model, e.g., the weights of edges of the neural network corresponding to the model 350. The machine learning module 340 may further generate a classifier 355 that is uses such techniques. The machine learning module 340 may periodically update the model 350 and/or classifiers 355 based on additional training data, or based on updated policies.

The detecting module 160 includes a browser 360, a vector generator 365, a vector aggregator 370, and a cloaking detector 375. The browser 360 and the vector generator 365 can be used to generate local semantic representations of content from the third party website 170, which the cloaking detector 375 compares to a vector from a mobile device 110 or 120 to determine whether the third party website 170 is performing cloaking. The browser 360 requests and receives online content from websites, such as the third party website 170. As described above, if the third party website 170 is performing cloaking, the content received from a given website by the browser 360 in the online system 140 differs from the content received from the same website by the browser 212 of a mobile device 110. For example, the third party website 170 may detect information about the online system 140 (e.g., user agent, IP address) when its browser 360 requests content, and after detecting that the online system 140 is requesting the content, the website 170 provides content to the browser 360 of the online system 140 that is different from the content it provided to the browser 212 of the mobile device 110.

The browser 360 may be similar to the browser 212 described with respect to FIG. 2. In some embodiments, the browser 360 mirrors the actions of the browser 212 with respect to third party websites 170. For example, the browser 360 may be an emulator, a crawler, or any process that invokes application programming interfaces (APIs) of a website to access web pages of the website. For example, the browser 360 may comprise instructions that send an HTTP (hypertext transfer protocol) requests to a website and receive a webpage in response. In particular, when the browser 212 requests content from a third party website 170, the browser 360 also requests the same content from the third party website 170. In some embodiments, the browser 360 requests from a third party website 170 all external content that is linked in a social network feed provided to the mobile devices 110, regardless of whether the browser 212 of the mobile device 110 accesses the linked content. In other embodiments, the browser 360 requests a sample of linked content provided to mobile devices 110 and 120, or a sample of linked content accessed by the browser 212. The sample may be a random sample (e.g., the online system 140 may randomly select mobile devices to mirror, randomly select content that is selected by a user to mirror, randomly select links in a social network feed to mirror, etc.). Alternatively, the sample may be selected based a likelihood of cloaking associated with the third party website 170 or some other predictive factor.

The vector generator 365 generates a semantic representation, based on the model 350, of online content received from the third party website 170 in the browser 360. The vector generator 365 may operate according to the same principles of the vector generator 216 described with respect to FIG. 2.

The vector aggregator 370 aggregates multiple vectors from mobile devices or the online system. A website may have some acceptable variations that are not indicative of cloaking. For example, a website may provide different advertisements to different users, or the website may provide modified content based on the language of the user, or the location of the user. If the browser 360 of the online system 140 receives different content from the browser 212 of the mobile device 110 for a legitimate reason (e.g., the mobile device 110 is located in a different country from the online system 140 and therefore receives different advertisements and modified content), the difference between the vector generated by the vector generator 365 in the online system 140 may be sufficiently different from the vector generated by the vector generator 216 of the mobile device 110 to trigger a false positive, i.e., to identify an instance of cloaking when the third party website 170 was not performing cloaking.

To avoid incorrectly ascribing legitimate content differences to cloaking, the detecting module 160 can include a vector aggregator 160 for aggregating vectors received from multiple mobile devices, such as mobile devices 110 and 120. To perform vector aggregation, multiple mobile devices request the same content from the website 170, each generates a vector representation of their respective received content, and each transmits the respective vector to the online system 140. The vector aggregator 370 then combines the received vectors, e.g., by addition, multiplication, or taking a statistical aggregate, for example, an average. Similarly, the browser 360 of the online system 140 can request content from the same website 170 and aggregate multiple vectors for the received content. In some embodiments, the online system 140 is distributed into multiple physical or virtual devices, each of which has a browser 360 and a vector generator 365; in this case, multiple different browsers 360 on the distributed online system 140 can retrieve content from the website 170. The different devices can have different locations (or apparent locations), languages, or may differ other aspects that could cause the content provided by the website 170 to vary for legitimate reasons. Aggregating the vectors received from multiple mobile devices and aggregating multiple vectors generated by the online system 140 can help to smooth out legitimate differences between individual vectors. The aggregate mobile device vector and the aggregate online system vector would be expected to be more similar than at least some pairings of a single mobile device vector and a single online system vector.

The cloaking detector 375 determines whether the third party website 170 performs cloaking based on vectors from the vector generator 216 of the mobile device 110, the vector generator 365 of the online system 140, and/or the vector aggregator 370. In some embodiments, the cloaking detector 375 compares a vector from the vector generator 216 of the mobile device 110 (or an aggregate vector of multiple mobile devices) to the classifier 355 to determine whether the content received by the mobile device 110 violates a policy. This is described in further detail with respect to FIG. 4. In some embodiments, the cloaking detector 375 compares a vector from the vector generator 216 of the mobile device 110 (or an aggregate vector of multiple mobile devices) to a vector from the vector generator 365 of the online system 140 (or an aggregate vector generated by the online system 140) to determine whether the mobile device vector differs from the online system vector by more than a threshold amount, indicating cloaking. For example, the cloaking detector 375 may calculate a measure of a distance between the vector representation of the content received by the mobile device 110 and the representation of the content received by the browser 360 of the online system 140; the measure of the distance indicates a level of similarity between the respective contents received by the mobile device 110 and the online system 140. The cloaking detector 375 then compares the measure of distance to a threshold. This process is described in further detail with respect to FIG. 5.

If cloaking is detected, the online system 140 can transmit instructions or alerts to mobile devices 110 and 120 regarding the cloaking website 170 using alert generator 380. Alternatively, the online system 140 can discontinue providing content from the third party website 170 or content comprising links to the third party website 170 to mobile devices 110 and 120 using the blocked store site 390. For example, if the online system 140 determines that certain newsfeed content identified for sending to users includes a link to the third party website 170, the online system 140 blocks the newsfeed content. Alternatively, if the online system 140 generates a newsfeed, the online system 140 may include a link to a website in the newsfeed content only if the link was not previously added to the blocked store site 390.

The alert generator 380 provides instructions to prevent or discourage mobile devices 110 and 120 accessing the online system 140 from accessing the third party website 170 after the cloaking detector 375 detects that the third party website 170 is performing cloaking. For example, if the mobile device 110 is running an application that accesses the online system 140, the alert generator can transmit an instruction to application that prevents the browser 212 of that application from accessing the website 170. Alternatively, the instruction may warn a user of the browser 212 that the website 170 may be performing cloaking, but still allow the browser 212 to access content from the website 170 if the user chooses to.

The blocked site store 390 stores information identifying websites that perform cloaking. The online system 140 can reference the blocked site store 390 when providing content to users. For example, before including a particular story from the content store 305 in a user feed, the online system 140 can compare the content with the websites in the blocked site store 390 to determine whether the content item should be included in the feed. If the content item includes content from a blocked site, or links to a blocked site, the online system 140 does not include this story in the feed. In other embodiments, the online system 140 can remove the story that included the blocked site from the content store 305, and the blocked site store 390 can be used to prevent new stories that involve a blocked site from being added to the content store 305.

Figure 4:
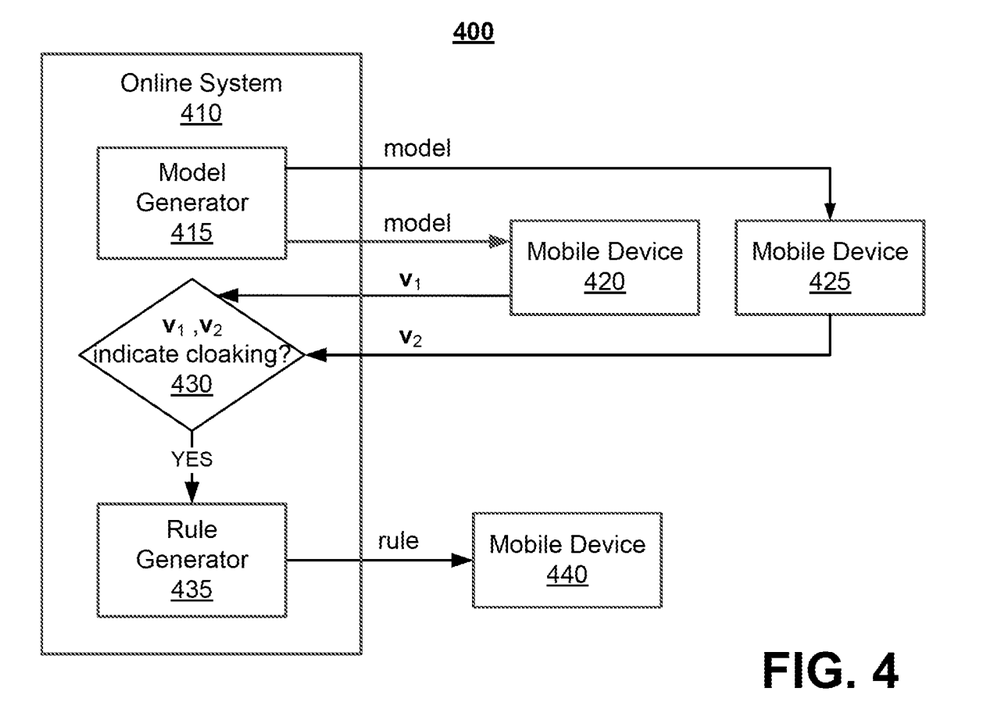
FIG. 4 is a flow diagram showing policy violation detection using multiple mobile devices, in accordance with an embodiment.

FIG. 4 is a flow diagram showing policy violation detection using multiple mobile devices, in accordance with an embodiment. FIG. 4 includes an online system 410 and several mobile devices 420, 425, and 440. The online system 410 is an embodiment of the online system 140 described with respect to FIGS. 1 and 3. The mobile devices 420, 425, and 440 are embodiments of the mobile devices 110 and 120 described with respect to FIGS. 1 and 2. The online system 140 includes a model generator 415 that generates a model that is transmitted to mobile devices. The model generator 415 is an embodiment of the modeling module 150 described with respect to FIGS. 1 and 3. For example, the model generator 415 may generate a convolution neural network that can be used to generate representations of content. The model generator also generates one or more classifiers, such as the classifier 355 described with respect to FIG. 3, which are used to identify content that violates a policy of the online system 140.

The mobile devices 420 and 425 each receive the model from the model generator 415 of the online system 410 and use this model to generate vector representations of content, represented as $v_1$ and $v_2$. The vectors $v_1$ and $v_2$ may represent content requested from the same website or from different websites. The mobile devices 420 and 425 transmit these vectors $v_1$ and $v_2$ to the online system 410. At decision 430, the online system 410 determines whether the received vectors from the mobile device indicate cloaking. For example, the decision 430 may be performed by the cloaking detector 375 described with respect to FIG. 3. In some embodiments, the vector aggregator 370 first combines the vectors $v_1$ and $v_2$ into an aggregated vector, e.g., by adding the vector values, or, for each value, taking an average for each component. In other embodiments, the decision 430 is performed twice, once for each of the vectors $v_1$ and $v_2$.

To determine that the vectors $v_1$ and $v_2$ indicate cloaking, the online system 410 compares each of the received vectors, or an aggregate vector, to one or more classifiers to determine whether the content represented by the vector(s) violates a policy of the online system. In some embodiments, the online system 410 compares an aggregate representation of vectors received from mobile devices within the online system (e.g., mobile devices that performs testing and validation of third party websites on behalf of the online system) with an aggregate representation of vectors received from mobile devices of users of the online system. For example, if the vectors represent a set of scores, each classifier in a set of classifiers may compare one or more scores in the vector, or ratios between scores in the vector, to one or more thresholds. For example, one or more of the scores may be indicative of or associated with content that is pornographic. Another score of set of scores may be indicative of or associate with content that is promotes illegal products or services. Additional scores or sets of scores may indicate that content is violent, or includes false content, or relates to some other policy violation. A single classifier can be used to represent all policy violations, or multiple classifiers can be used. If a received vector exceeds the threshold(s) indicated by a classifier, the content represented by the vector is determined to violate a policy.

In this context, the decision 430 detects when a website violates a policy, and not necessarily when a website that provides content to the mobile devices 420 and 425 that is different from the content that the website would provide to the online system 410. The decision 430 does not analyze content received at the online system 410 from the same website, so the website may or may not provide cloaked content to the online system 410. In some embodiments, the online system 410 may also retrieve content from the website to compare to the content received at the mobile devices 420 and 425 to determine whether the website provides cloaked content. In either case, the model can be used to detect policy violations and prevent future access to the website.

If the vector $v_1$ and/or $v_2$ indicate a policy violation, a rule generator 435 within the online system 410 generates a rule that is applied to one or more mobile devices 440. The rule may be sent from the online system 410 to a mobile device 440, or the rule may prevent the mobile device 440 from receiving content to or links from the cloaking website. The rule may also be applied to other mobile devices, such as mobile devices 420 and 425.

If the online system 410 provides a feed to the mobile device 440, the rule generated by the rule generator 435 may cause the online system 410 to not include content from and links to the cloaking website in the feed. If the mobile device 440 runs an application managed by the online system 440, the online system 410 may provide an instruction to the application on the mobile device 440 to prevent the application from navigating to the website.

Figure 5:
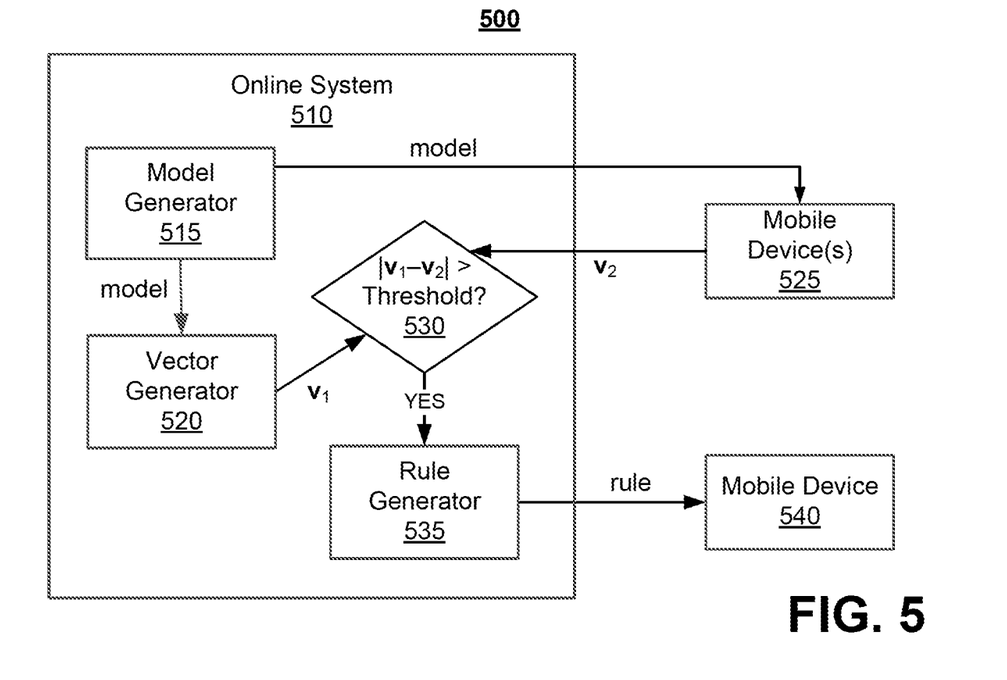
FIG. 5 is a flow diagram showing cloaking detection using vectors generated by a mobile device and the online system, in accordance with an embodiment.

FIG. 5 is a flow diagram showing cloaking detection using vectors generated by a mobile device and the online system, in accordance with an embodiment. FIG. 5 includes an online system 510 and mobile devices 525 and 540. The online system 510 is an embodiment of the online system 140 described with respect to FIGS. 1 and 3. The mobile devices 525 and 540 are embodiments of the mobile devices 110 and 120 described with respect to FIGS. 1 and 2. The online system 510 includes a model generator 515 that generates a model that is transmitted to mobile devices 525 and used by a vector generator 520 within the online system 510. The model generator 515 is an embodiment of the modeling module 150 described with respect to FIGS. 1 and 3. For example, the model generator 515 may generate a convolution neural network that can be used to generate representations of content.

The vector generator 520 in the online system 510 generates a first vector $v_1$ based on the model and content retrieved by the online system 510 (e.g., by browser 360) from a website. The mobile device 525 generates a second vector $v_2$ based on the model and content retrieved at the mobile device 525 from the same website. In some embodiments, the first vector $v_1$ is an aggregated vector of multiple content vectors generated by the online system 510, and the second vector $v_2$ is an aggregated vector of multiple content vectors generated by multiple mobile devices. Vector aggregation is described with respect to FIG. 3.

At decision 530, the online system 510 determines whether the vectors $v_1$ and $v_2$ indicate cloaking. The decision 530 may be performed by the cloaking detector 375 described with respect to FIG. 3. The cloaking detector 375 may calculate a measure of distance between the two vectors that indicates a level of similarity between the content received by the mobile device and the online system. In particular, the decision 530 may compare the two vectors by calculating a difference between the vectors, and then comparing the result of the calculation to a threshold. In some embodiments, some or all of the vector components of the calculated difference are compared to the components of a threshold vector. The threshold may be exceeded if one component in the difference vector exceeds its associated threshold, or if some combination of components in the difference vector exceed their associated threshold, or if some other rule is satisfied. In other embodiments, and average of some or all of the components of the difference vector are compared to a single threshold.

If the decision 530 indicates that the website has performed cloaking, a rule generator 535 within the online system 510 generates a rule that is applied to a mobile device 540. The rule may be sent from the online system 510 to a mobile device 540, or the rule may prevent the mobile device 540 from receiving content to or links from the cloaking website. The rule may also be applied to other mobile devices, such as mobile device 525.

If the online system 510 provides a feed to the mobile device 540, the rule generated by the rule generator 535 may cause the online system 510 to not include content from or links to the cloaking website in the feed provided to the mobile device 540. If the mobile device 540 runs an application managed by the online system 510, the online system 510 may provide an instruction to the application on the mobile device 540 to prevent the application from navigating to the website.

Figure 6:
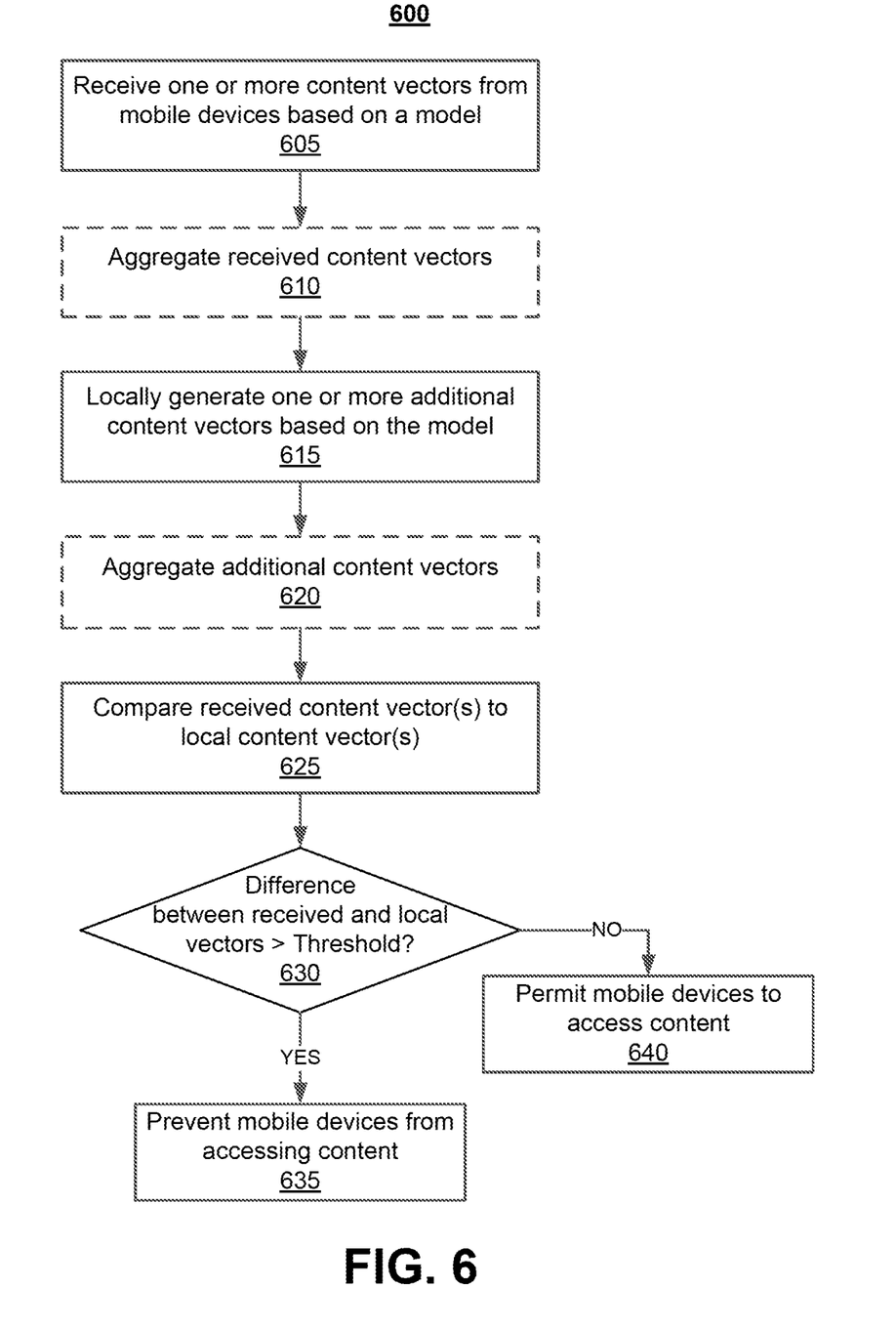
FIG. 6 is a flow diagram of a process for detecting cloaking based on content vectors, in accordance with an embodiment.

FIG. 6 is a flow diagram of a process 600 for detecting cloaking based on content vectors, in accordance with an embodiment. The process 600 may be performed by an online system 140, e.g., by the detecting module 160. Other entities may perform some or all of the steps in the process 600 in other embodiments. For example, one or more steps may be performed by an external provider, such as a third party website 170, or a mobile device 110 or 120. Likewise, embodiments may include different and/or additional steps, or perform the steps in different orders.

At 605, the online system 140 receives one or more content vectors from one or more mobile devices (e.g., mobile devices 110 and 120) that the mobile device(s) generated based on a model. For example, a first mobile device 110 may receive and store a model 214 generated by the modeling module 150, generate a first vector for content received from the third party website 170, and transmit this first vector to the online system 140. A second mobile device 110 may generate and transmit a second vector based on content received at the second mobile device 110 from the same third party website 170. Generation of a vector by a mobile device is described with respect to FIG. 2.

At 610, the online system 140 aggregates received content vectors. Action 610 is optional, as indicated by the dotted lines in FIG. 6. Action 610 is only performed when the online system 140 receives multiple content vectors generated based on content received from the same third party website 170. In the above example, the online system 140 has received a first content vector from the first mobile device 110 and a second content vector from the second mobile device 120. Accordingly, the vector aggregator 370 in the detecting module 160 of the online system 140 aggregates the first and second vectors. Vector aggregation is described in greater detail with respect to FIG. 3.

At 615, the online system 140 sends requests to the website, receives content from the website, and locally generates one or more additional content vectors representing the received content based on the model 350. The requests may be sent by one or more mobile devices of the online system 140 or by an application or process executing on the online system 140. The model 350 stored at the online system 140 corresponds to the model 214 stored at the first mobile device 110 and second mobile device 120. The content vector(s) represent content from the third party website 170; if the third party website 170 is not performing cloaking, the content received by the online system 140 should be the same, or similar to, the content received by the mobile devices 110 and 120. For example, the browser 360 in the online system 140 may request the same URL that was requested by the mobile devices 110 and 120. In some embodiments, the online system 140 generates multiple content vectors based on the same request to the third party website 170 to account for acceptable variations in the provided content (e.g., different advertisements, language, content based on geography, etc.). In this case, the vectors may be generated by a distributed online system 140 that includes devices (e.g., servers) in different locations, or with different profiles. In other embodiments, the online system 140 runs multiple virtual machines, each having at least a browser, to generate multiple content vectors. The virtual machines may be associated with different user profiles or locations. Vector generation by the online system 140 is described further with respect to FIGS. 2 and 3.

At 620, the online system 140 aggregates the additional, locally generated content vectors. Action 620 is optional, as indicated by the dotted lines in FIG. 6. Action 620 is only performed when the online system 140 generates multiple additional vectors generated based on content received from the same third party website 170. Vector aggregation is described in greater detail with respect to FIG. 3.

At 625, the online system 140 compares the received content vector (or the aggregation of multiple received content vectors) to the local content vector (or the aggregation of multiple content vectors generated by the online system 140). For example, the online system 140 may compute a difference between a received content vector and a local content vector.

At 630, the online system 140 compares the difference between the received content vector and local content vector to a threshold. In some embodiments, the threshold is a vector, and the values within the threshold vector are compared to one or more values within the difference vector. Various rules for computing and assessing the difference between the received and local vectors are described with respect to FIG. 5.

If the difference between the received and local vectors exceeds the threshold, then at 635, the online system 140 prevents mobile devices from accessing content from the third party website 170. For example, the online system 140 may provide instructions to mobile devices 110 and 120 instructing them to block or discourage users from accessing the third party website 170, or the online system 140 may discontinue providing content from or links to the third party website 170 to mobile devices 110 and 120. Preventing mobile devices from accessing content is described in further detail with respect to FIG. 3.

If the difference between the received and local vectors does not exceed the threshold, then at 640, mobile devices are permitted to continue accessing content from the third party website 170.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for detecting cloaking of websites comprising:
   sending, by an online system, a feed story to a mobile device of a user of the online system, the feed story including a uniform resource locator (URL) of a website;
   receiving, by the online system from the mobile device, a semantic representation of a first content received by the mobile device from the website responsive to the mobile device accessing the URL, the semantic representation generated by the mobile device using a machine learning model;
   sending, by the online system, a request to the website for content associated with the URL accessed by the mobile device;
   receiving, by the online system, a second content from the website responsive to the request;
   generating, by the online system, a semantic representation, using the machine learning model, of the second content received by the online system from the website;
   determining, by the online system, a measure of a distance between the semantic representation of the first content received by the mobile device of the user from the website to the semantic representation of the second content received by the online system from the website, wherein the measure of the distance indicates a level of similarity between the first content and the second content;
   comparing, by the online system, the measure of the distance between the semantic representation of the first content to the semantic representation of the second content with a threshold distance to determine that the distance exceeds the threshold distance; and
   in response to determining that the distance exceeds the threshold distance, preventing access to the website associated with the URL accessed by the mobile device.

2. The method of claim 1, wherein determining the measure of the distance between the semantic representation of the first content received by the mobile device of the user from the website to the semantic representation of the second content received by the online system from the website further comprises:
   receiving, from a second mobile device, a semantic representation of third content received from the website, the semantic representation of the third content generated by the second mobile device using the machine learning model;

aggregating the semantic representation of the first content and the semantic representation of the third content to obtain an aggregate semantic representation; and determining the measure of the distance between the aggregate semantic representation and the semantic representation of the second content.

3. The method of claim 1, wherein obtaining the semantic representation of the second content comprises:

requesting content from the website;

receiving, from the website, the second content; and generating the semantic representation of the second content using the machine learning model.

4. The method of claim 1, wherein obtaining the semantic representation of the second content comprises:

transmitting a plurality of requests for content from the website;

receiving a plurality of web pages comprising a plurality of contents; and generating a plurality of semantic representations of the received plurality of contents using the machine learning model; and aggregating the plurality of semantic representations to obtain the semantic representation of the second content.

5. The method of claim 1, further comprising:

generating a classifier based on the semantic representation of the first content; and determining, based on the classifier, whether the website violates a policy.

6. The method of claim 1, further comprising:

in response to determining that the distance exceeds the threshold distance, storing information identifying that the website performs cloaking.

7. The method of claim 1, further comprising:

generating, by the online system, the machine learning model for generating a semantic representation of content, wherein the machine learning model is a convolution neural network; and transmitting, by the online system, the machine learning model for generating a semantic representation of content to a plurality of mobile devices including the mobile device.

8. The method of claim 1, wherein preventing access to the website comprises transmitting an instruction to a third device preventing the third device from accessing the website.

9. The method of claim 1, wherein preventing access to the website comprises blocking a particular content from users of the online system responsive to determining that the particular content includes a URL of a webpage of the website.

10. A non-transitory computer readable medium comprising computer code executable on a hardware processor for detecting cloaking of websites, the computer code when executed by the hardware processor, causing the hardware processor to perform the steps comprising:

sending a feed story to a mobile device of a user of the online system, the feed story including a uniform resource locator (URL) of a website;

receiving by the online system, from the mobile device, a first semantic representation of a first content received by the mobile device from the website responsive to the mobile device accessing the URL, the first semantic representation generated by the mobile device using a machine learning model;

sending a request to the website by the online system for content associated with the URL accessed by the mobile device;

receiving a second content from the website responsive to the request;

generating a semantic representation, using the machine learning model, of the second content received by the online system from the website;

determining by the online system a measure of a distance between the semantic representation of the first content received by the mobile device of the user from the website to the semantic representation of the second content received by the online system from the website, wherein the measure of distance indicates a level of similarity between the first content and the second content;

comparing by the online system the measure of the distance between the semantic representation of the first content to the semantic representation of the second content with a threshold distance to determine that the measure of distance exceeds the threshold distance; and in response to determining that the measure of distance exceeds the threshold distance, preventing access to the website associated with the URL accessed by the mobile device.

11. A method for detecting cloaking of websites comprising:

receiving by an online system, from a first mobile device in response to accessing a uniform resource locator (URL) of a website, a first semantic representation of a first content received by the first mobile device from the website, the first semantic representation generated by the first mobile device using a machine learning model;

sending a request to the website, by the online system, for content associated with the URL accessed by the mobile device;

obtaining a second semantic representation generated using the machine learning model, the second semantic representation of a second content received from the website responsive to the request;

comparing the first semantic representation of the first content to the second semantic representation of the second content to determine a distance between the first semantic representation and the second semantic representation, wherein the distance indicates a level of similarity between the first content and the second content;

comparing the distance between the first semantic representation and the second semantic representation to determine that the distance exceeds a threshold distance; and in response to determining that the distance exceeds the threshold distance, preventing a third device from accessing the website associated with the URL accessed by the mobile device.

12. The method of claim 11, wherein comparing the first semantic representation of the first content to the second semantic representation of the second content to determine a distance between the first semantic representation and the second semantic representation further comprises:

receiving, from a second mobile device, a third semantic representation of third content received from the website, the third semantic representation generated by the second mobile device using the machine learning model;

aggregating the first semantic representation of the first content and the third semantic representation of the third content to obtain an aggregate semantic representation; and comparing the aggregate semantic representation to the second semantic representation to determine a distance between the aggregate semantic representation and the second semantic representation.

13. The method of claim 11, wherein obtaining the second semantic representation comprises:

requesting content from the website;

receiving, from the website, the second content; and generating the second semantic representation of the second content using the machine learning model.

14. The method of claim 11, wherein obtaining the second semantic representation comprises:

transmitting a plurality of requests for content from the website;

receiving a plurality of web pages comprising a plurality of contents; and generating a plurality of semantic representations of the received plurality of contents using the machine learning model; and aggregating the plurality of semantic representations to obtain the second semantic representation.

15. The method of claim 11, further comprising:

generating a classifier based on the first semantic representation of the first content; and determining, based on the classifier, whether the website violates a policy.

16. The method of claim 11, further comprising:

in response to determining that the distance exceeds the threshold distance, storing information identifying that the website performs cloaking.

17. The method of claim 11, further comprising:

generating the machine learning model for generating a semantic representation of content, wherein the machine learning model is a convolution neural network; and transmitting the machine learning model for generating a semantic representation of content to a plurality of mobile devices including the first mobile device.

18. The method of claim 11, wherein the first semantic representation of the first content and the second semantic representation of the second content are vector representations.

19. The method of claim 11, wherein preventing the third device from accessing the website comprises transmitting an instruction to the third device preventing the third device from accessing the website.

20. The method of claim 11, wherein preventing the third device from accessing the website further comprises blocking a particular content from users of the online system responsive to determining that the particular content includes a URL of a webpage of the website.

* * * * *